(12) United States Patent
Mukai

(10) Patent No.: US 11,734,003 B2
(45) Date of Patent: Aug. 22, 2023

(54) NON-TRANSITORY COMPUTER-READABLE RECORDING MEDIUM, COMPILATION METHOD, AND COMPILER DEVICE

(71) Applicant: FUJITSU LIMITED, Kawasaki (JP)

(72) Inventor: Yuta Mukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/552,358

(22) Filed: Dec. 16, 2021

(65) Prior Publication Data
US 2022/0382548 A1 Dec. 1, 2022

(30) Foreign Application Priority Data
May 28, 2021 (JP) .................................. 2021-089727

(51) Int. Cl.
*G06F 9/30* (2018.01)
*G06F 8/41* (2018.01)
(52) U.S. Cl.
CPC .......... *G06F 9/30065* (2013.01); *G06F 8/443* (2013.01); *G06F 9/30036* (2013.01); *G06F 9/30069* (2013.01)
(58) Field of Classification Search
None
See application file for complete search history.

(56) References Cited

U.S. PATENT DOCUMENTS

| | | | | |
|---|---|---|---|---|
| 6,418,531 B1 * | 7/2002 | Nakahara | ................ | G06F 9/325 |
| | | | | 712/241 |
| 6,622,301 B1 * | 9/2003 | Hirooka | .................. | G06F 8/452 |
| | | | | 717/160 |
| 7,814,468 B1 * | 10/2010 | Song | ....................... | G06F 8/452 |
| | | | | 717/136 |

(Continued)

FOREIGN PATENT DOCUMENTS

| | | |
|---|---|---|
| JP | H11-272650 A | 10/1999 |
| JP | 2013-242604 A | 12/2013 |

OTHER PUBLICATIONS

Intel, "The Intel® Advanced Vector Extensions 512 (Intel® AVX-512) Vector Length Extensions Feature on Intel® Xeon® Scalable Processors" obtained from the following URL which is the website of Intel Corporation: https://www.intel.com/content/www/us/en/developer/articles/technical/the-intel-advanced-vector-extensions-512-feature-on-intel-xeon-scalable.html, Mar. 28, 2018, 4 pages.

*Primary Examiner* — Eric Coleman
(74) *Attorney, Agent, or Firm* — Fujitsu Patent Center

(57) ABSTRACT

The present disclosure relates to a compiler for causing a computer to execute a process. The process includes generating a first program, wherein the first program includes a first code that determines whether a first area of a memory that a process inside a loop included in a second program refers to in a first execution time of the loop is in duplicate with a second area of the memory that the process refers to in a second execution time of the loop, a second code that executes the process in an order of the first and second (Continued)

```
for i = 0 to N - 1
  array[i] = array[i] + 1
``` execution times when it is determined that the first and the second areas are duplicate, and a third code that executes the process for the first execution time and the process for the second execution time in parallel when it is determined that the first and the second areas are not duplicate.

6 Claims, 18 Drawing Sheets

(56) References Cited

U.S. PATENT DOCUMENTS

| | | | | |
|---|---|---|---|---|
| 8,793,675 B2* | 7/2014 | Lin | | G06F 8/456 |
| | | | | 717/160 |
| 9,038,042 B2* | 5/2015 | Perkins | | G06F 8/452 |
| | | | | 717/150 |
| 9,471,289 B2* | 10/2016 | Feng | | G06F 8/51 |
| 10,095,434 B2* | 10/2018 | Baskaran | | G06F 8/4432 |
| 2006/0294510 A1* | 12/2006 | Hank | | G06F 8/443 |
| | | | | 717/151 |
| 2008/0140980 A1* | 6/2008 | Mei | | G06F 12/0851 |
| | | | | 711/E12.047 |
| 2008/0250213 A1* | 10/2008 | Holt | | G06F 11/1666 |
| | | | | 711/159 |
| 2011/0078670 A1* | 3/2011 | Viry | | G06F 8/436 |
| | | | | 717/149 |
| 2011/0161643 A1* | 6/2011 | Eichenberger | | G06F 9/3887 |
| | | | | 712/241 |
| 2015/0168936 A1* | 6/2015 | Martinez Canedo | | |
| | | | | G05B 19/0421 |
| | | | | 700/20 |
| 2017/0116276 A1* | 4/2017 | Ziauddin | | G06F 16/2454 |
| 2017/0168745 A1* | 6/2017 | Burlacu-Zane | | G06F 8/433 |
| 2020/0104139 A1* | 4/2020 | Pearce | | G06F 9/3891 |

* cited by examiner

```
for i = 0 to N - 1
    array[i] = array[i] + 1
```

```
for i = 0 to N - 1
  k = index[i]
  array[k] = array[k] + 1
```

FIG. 8

```
for i = 0 to N - 1
    sum = sum + array[i]
```
41

FIG. 10A

```
for i = 0 to N - 1
    array[i] = array[i] + 1
```
41

FIG. 10B

```
parallel for i = 0 to N - 1
    array[i] = array[i] + 1    ---- 51
```
42

FIG. 12

```
1:  if (has_no_duplicated_index()) {
2:      parallel for i=0 to N-1
3:          k = index[i]
4:          array[k] = array[k] + 1          ---53
5:  } else {
6:      for i=0 to N-1
7:          k = index[i]
8:          array[k] = array[k] + 1          ---53
9:  }
10:
11: Function has_no_duplicated_index() {
12:     for i = 0 to N - 1
13:         for j = 0 to N - 1
14:             if i != j & index[i] == index[j]
15:                 return FALSE
16:     return TRUE
17: }
```

Line 2–4 labeled 58; lines 6–8 labeled 57; lines 11–17 labeled 56; block 42.

FIG. 13

```
1:  calc_vectorizable_iteration()
2:  for i = 0 to N/VL - 1
3:    if (vectorizable[i] == TRUE) {
4:
5:      k = index[i * VL : (i+1) * VL-1]              ---58
6:      array[k] = array[k] + (1, 1, ..., 1)
7:    } else {
8:
9:      for j = i * VL to (i+1) * VL
10:       k = index[j]                                ---57
11:       array[j] = array[j] + 1    ---53
12:   }
13:
14: Function calc_vectorizable_iteration() {
15:   for p = 0 to N/VL - 1
16:     if (has_no_duplicated_index_vector(p*VL)) {
17:       vectorizable[p] = TRUE
18:     } else {                                      ---59
19:       vectorizable[p] = FALSE
20:     }
21: }
22:
23: Function has_no_duplicated_index_vector(iter) {
24:   for i = iter to iter + VL - 1
25:     for j = iter to iter + VL - 1
26:       if (i != j & index[i] == index[j]) {        ---56
27:         return FALSE
          }
28:   return TRUE
29: }
```

| index | 1 | 2 | 3 | 3 | 1 | 1 | 2 | 3 |
|---|---|---|---|---|---|---|---|---|
| vectorizable | TRUE | | FALSE | | FALSE | | TRUE | |

FIG. 16

```
1:  if (has_no_duplicated_index(&index[0], &index[N-1] )) {
2:      parallel for i=0 to N-1
3:          k = index[i]                            ---58
4:          array[k] = array[k] + 1   ---53
5:  } else {
6:      for i=0 to N-1
7:          k = index[i]                            ---57
8:          array[k] = array[k] + 1   ---53
9:  }
10:                                                                              56
11: Function has_no_duplicated_index(start_addr, end_addr) {
12:     if (is_check_done[{start_addr, end_addr}] == TRUE)
13:         return result[{start_addr, end_addr}]               ---63
14:     result[{start_addr, end_addr}] = TRUE       ---61a
15:     for i = start_addr to end_addr
16:         for j = start_addr to end_addr                       }61
17:             if (i != j & *i == *j)
18:                 result[{start_addr, end_addr}] = FALSE  ---61b
19:     is_check_done[{start_addr, end_addr}] = TRUE
20:     If (there is area in duplicate with address range between
              start_addr and end_addr and that satisfies
                         is_check_done == TRUE)
21:         set is_check_done == FALSE for each area,
                      and cancel watchpoint
22:     set_watchpoint(start_addr, end_addr, disable_result)  ---62
23:     return result[{start_addr, end_addr}]
24: }
25:
26: Function disable_result() {
27:     {start_addr, end_addr} = target address range for exception generation
28:     is_check_done[{start_addr, end_addr}] = FALSE
29:     unset_watchpoint(start_addr, end_addr)
30: }
```

42

NON-TRANSITORY COMPUTER-READABLE RECORDING MEDIUM, COMPILATION METHOD, AND COMPILER DEVICE

CROSS-REFERENCE TO RELATED APPLICATION

This application is based upon and claims the benefit of priority of the prior Japanese Patent Application No. 2021-089727 filed on May 28, 2021, the entire contents of which are incorporated herein by reference.

FIELD

A certain aspect of the embodiments is related to a non-transitory computer-readable recording medium, a compilation method, and a compiler device.

BACKGROUND

It is effective to parallelize a program in order to improve the execution speed of the program on a computer. In particular, parallelizing loops that occupy most of a program execution time can efficiently improve the execution speed.

For example, when a plurality of iterations in the loops are executed in parallel by a plurality of arithmetic cores, respectively, the execution time can be shortened as compared with a case where all the iterations are sequentially executed by one arithmetic core.

However, if such parallelization is performed when the areas in the memory of respective reference destinations of the plurality of iterations are duplicate, the contents of the area referenced in one iteration are changed when another iteration is executed. As a result, an execution result of the program changes as compared with a case where the parallelization is not performed. Note that the technique related to the present disclosure is disclosed in Japanese Laid-open Patent Publication No. 11-272650 and Japanese Laid-open Patent Publication No. 2013-242604.

SUMMARY

According to an aspect of the present disclosure, there is provided a non-transitory computer-readable recording medium for causing a computer to execute a process, the process including: generating a first program; wherein the first program includes: a first code that determines whether a first area of a memory that a process inside a loop included in a second program refers to in a first execution time of the loop is in duplicate with a second area of the memory that the process refers to in a second execution time of the loop; a second code that executes the process in an order of the first and second execution times when it is determined that the first area and the second area are duplicate; and a third code that executes the process for the first execution time and the process for the second execution time in parallel when it is determined that the first area and the second area are not duplicate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a schematic diagram of a pseudo code obtained by converting an intermediate code having a dependency without through a memory between iterations into a source code;

FIG. 10A is a schematic diagram of a pseudo code obtained by converting the intermediate code that is a source of the optimization code into the source code;

FIG. 10B is a schematic diagram of a pseudo code obtained by converting the optimization code generated from the loop of FIG. 10A into the source code;

FIG. 12 is a schematic diagram of a pseudo code obtained by converting the optimization code generated by an optimization code generation unit according to the first embodiment into the source code;

FIG. 13 is a schematic diagram of a pseudo code obtained by converting the optimization code in the case of parallelizing the processes by vectorization into the source code in the first embodiment;

FIG. 14 is a schematic diagram illustrating an example of values of the respective elements in the respective arrays "vectorizable" and "index" when a length "VL" of a vector is 2 in the first embodiment;

FIG. 16 is a schematic diagram of a pseudo code obtained by converting the optimization code generated by the optimization code generation unit into the source code in the second embodiment;

DESCRIPTION OF EMBODIMENTS

It is an object of the present disclosure to increase the execution speed of the program.

Prior to the description of the present embodiment, matters studied by an inventor will be described.

As mentioned above, it is effective to parallelize the loops in order to improve the execution speed of the program.

Figures 1A, 1B:
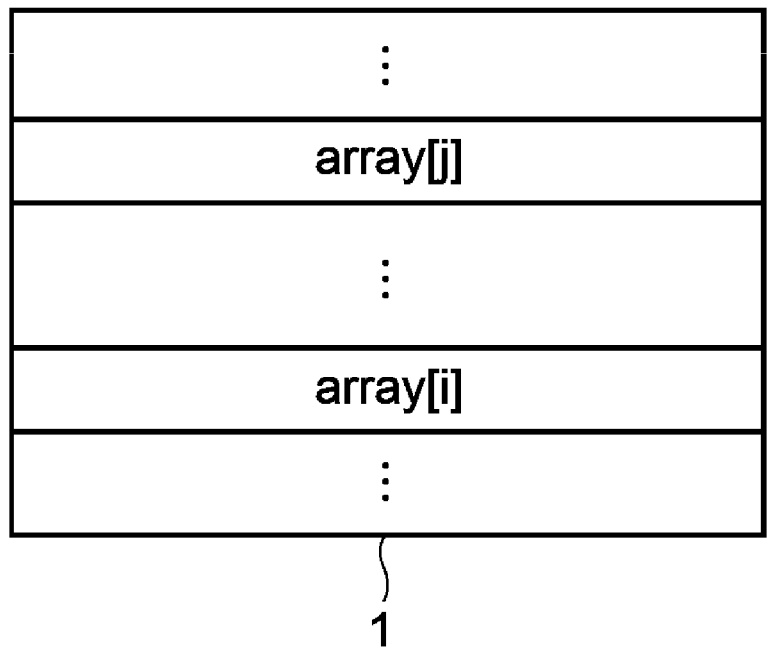
FIG. 1A is a schematic diagram illustrating a pseudo code of a loop that can be parallelized.
FIG. 1B is a schematic diagram illustrating storage locations of array[i] and array[j] as array elements in a memory.

FIG. 1A is a schematic diagram illustrating a pseudo code of a loop that can be parallelized. In an example of FIG. 1A, the loop by a for statement is assumed, and a process "array[i]=array[i]+1" is executed in an i-th iteration. The iteration is an integer indicating the number of times the loop is executed.

FIG. 1B is a schematic diagram illustrating storage locations of array[i] and array [j ] as array elements in a memory.

The above process "array[i]=array[i]+1" loads the array element "array[i]" stored in a memory 1, and stores in the memory 1 a value obtained by adding 1 to a value of the array element. A reference destination in the memory 1 in this process is "array [i]", and if the iterations are different from each other, the reference destination also changes.

For example, if i and j are different integers, "array[i ]" and "array[j]" are stored in different areas of the memory as illustrated in FIG. 1B, so that the reference destination in the memory for the i-th iteration also changes from that for the j-th iteration.

Therefore, even if the i-th and the j-th iterations are executed in parallel on different arithmetic cores, an execution result is the same as that before the parallelization. Thus, the loop in FIG. 1A is a process that can be parallelized.

Figures 2A, 2B:
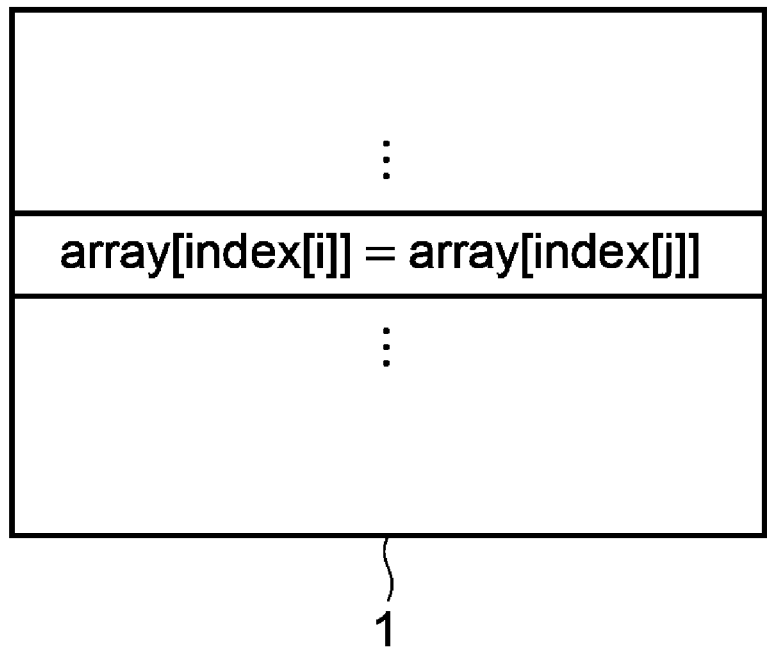
FIG. 2A is a schematic diagram illustrating a pseudo code of a loop that may not be parallelized.
FIG. 2B is a schematic diagram illustrating storage locations of "array [index[i]]" and "array [index[j]]" as array elements in the memory in this case.

On the other hand, FIG. 2A illustrates a pseudo code of a loop that may not be parallelized. In this example, the index of the array "array" is determined by an element of another array "index". Here, it is assumed that there are different integers i and j such that index[i]=index[j] is satisfied.

FIG. 2B is a schematic diagram illustrating storage locations of "array [index[i]]" and "array[index[j]]" as array elements in the memory 1 in this case.

In this case, the reference destinations "array [index[i]]" and "array[index[j]]" in the i-th and the j-th iterations are the same as illustrated in FIG. 2B.

Therefore, when the i-th and the j-th iterations are executed in parallel, the execution result may change compared to the case where they are not parallelized.

When the i-th and the j-th iterations are executed in this order, the processes are executed in the following order.

(1) Generate a value x by adding 1 to the array[index[i]].
(2) Store x in the array[index[i]].
(3) Generate a value y by adding 1 to the array[index[j]].
(4) Store y in the array[index[j]].

In this case, if the value of array[index[i]] =array[index [j]] before executing the loop is n, then the value of array[index[i]] =array[index[j]] after executing the loop is n+2.

On the other hand, if the i-th and the j-th iterations are executed in parallel, the processes may be executed in the following order.

(1) Generate a value x by adding 1 to the array[index[i]].
(2) Generate a value y by adding 1 to the array[index[j]].
(3) Store x in the array[index[i]].
(4) Store y in the array[index[j]].

In this case, the value of array[index[i]]=array[index[j]] after executing the loop gives a wrong result of n+1.

Therefore, the loops cannot be parallelized when the reference destinations of the memory in different iterations are duplicate, such as the case of index[i]=index[j] for different i and j.

However, if index[i] and index[j] are different for all i and j, the loops can be parallelized because the reference destinations of the memory in the different iterations are not duplicate. Therefore, it is preferable to decide whether to perform parallelization according to the reference destinations of the memory in the different iterations, and parallelize the loops to speed up the execution speed of the program if the parallelization can be performed.

First Embodiment

Figure 3:
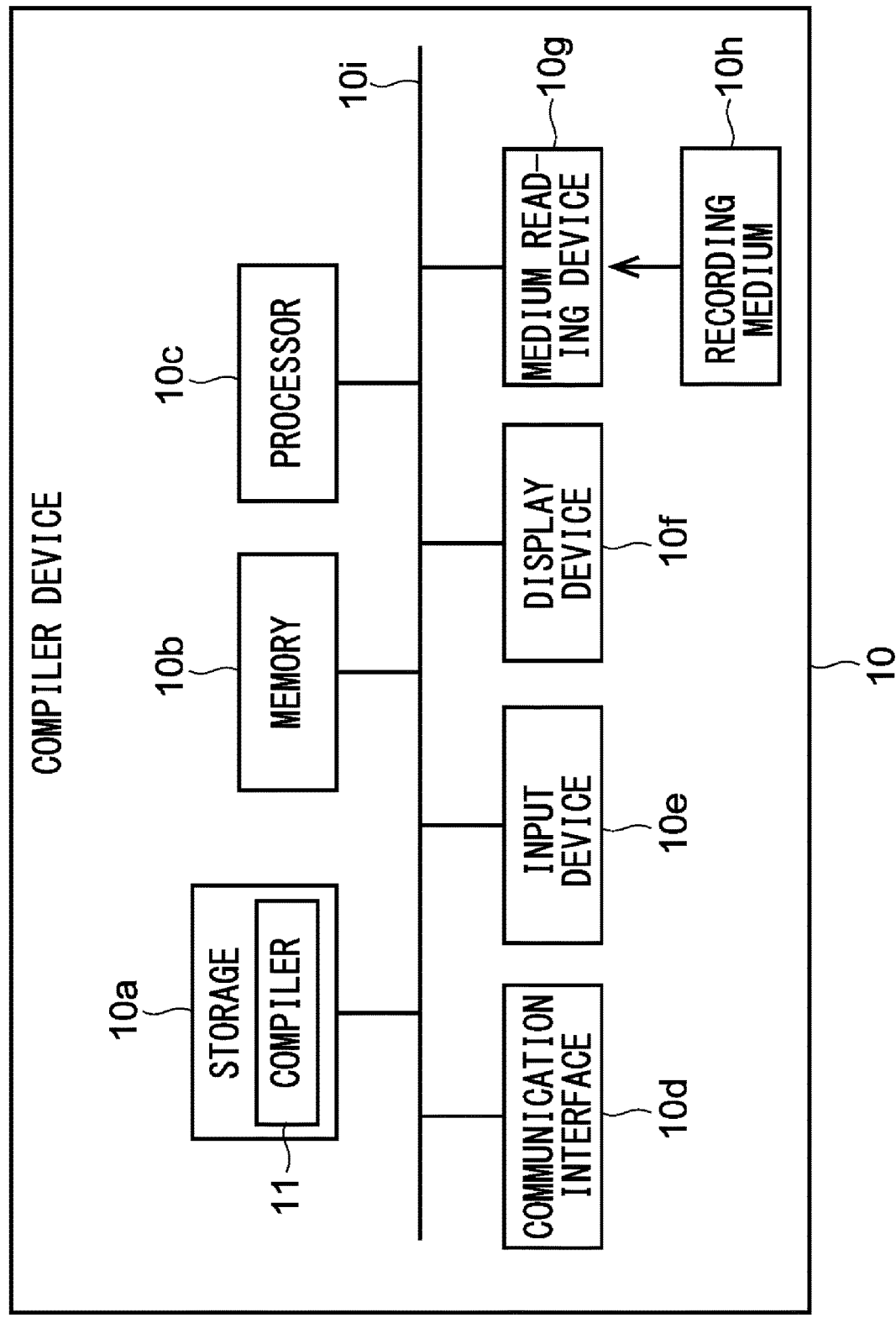
FIG. 3 is a hardware configuration diagram of a compiler device according to a first embodiment.

FIG. 3 is a hardware configuration diagram of a compiler device according to a first embodiment.

A compiler device 10 is a computer such as a virtual machine or a physical machine, and includes a storage 10a, a memory 10b, a processor 10c, a communication interface 10d, an input device 10e, a display device 10f, and a medium reading device 10g. These elements are connected to each other by a bus 10i.

The storage 10a is a non-volatile storage such as an HDD (Hard Disk Drive) or an SSD (Solid State Drive), and stores a compiler 11 according to the present embodiment.

The compiler 11 may be recorded on a computer-readable recording medium 10h, and the processor 10c may be made to read the compiler 11 through the medium reading device 10g.

Examples of such a recording medium 10h include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 10h. The recording medium 10h is not a temporary medium such as a carrier wave having no physical form.

Further, the compiler 11 may be stored in a device connected to a public line, the Internet, a LAN (Local Area Network), or the like. In this case, the processor 10c may read and execute the compiler 11.

Meanwhile, the memory 10b is hardware that temporarily stores data, such as a DRAM (Dynamic Random Access Memory).

The processor 10c is a CPU or a GPU (Graphical Processing Unit) that controls each part of the compiler device 10. Further, the processor 10c executes the compiler 11 in cooperation with the memory 10b.

Further, the communication interface 10d is hardware such as a NIC (Network Interface Card) for connecting the compiler device 10 to a network such as the Internet or the LAN (Local Area Network).

The input device 10e is hardware such as a mouse and a keyboard for the user to input various data into the compiler device 10. Further, the display device 10f is hardware such as a liquid crystal display that displays a compilation result, an error occurred during compilation, and the like.

The medium reading device 10g is hardware such as a CD drive, a DVD drive, and a USB interface for reading the recording medium 10h.

Figure 4:
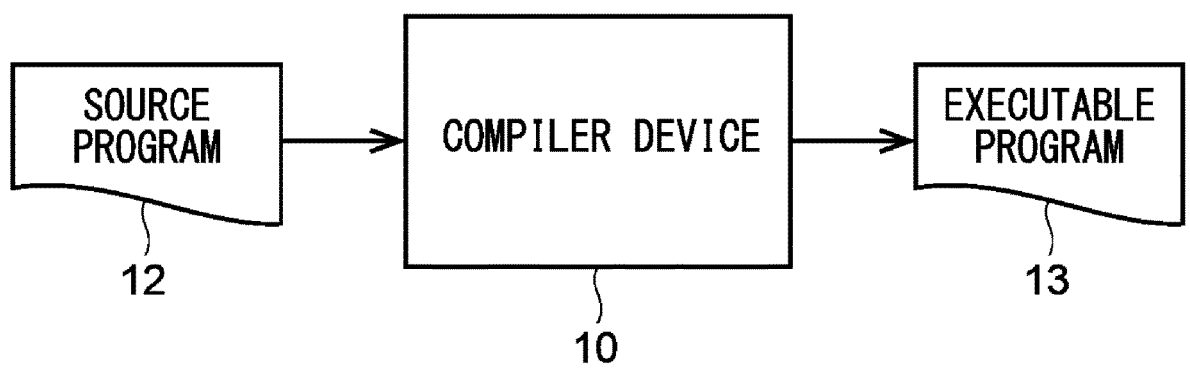
FIG. 4 is a schematic diagram illustrating a process performed by the compiler device according to the first embodiment.

FIG. 4 is a schematic diagram illustrating a process performed by the compiler device 10. As illustrated in FIG. 4, the compiler device 10 is a device that acquires a source program 12 and converts it into an executable program 13. The programming language in the source program 12 is not particularly limited, and for example, the source program 12 written in C language, C++ language, or the like can be adopted.

The executable program 13 is a binary file that can be executed on a target machine. The target machine is, for example, a computer for HPC different from the compiler device 10.

Figure 5:
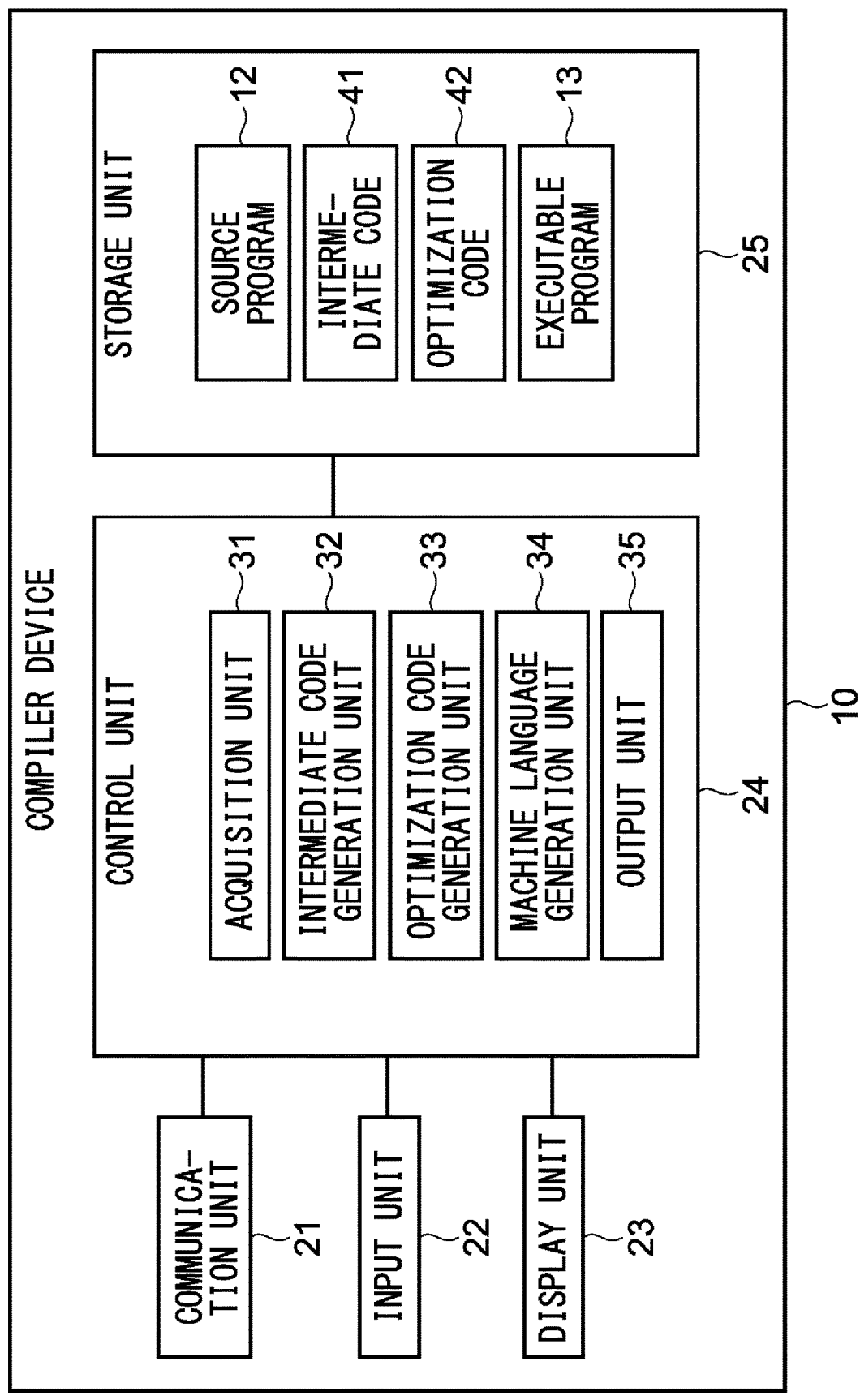
FIG. 5 is a functional configuration diagram of the compiler device according to the first embodiment.

FIG. 5 is a functional configuration diagram of the compiler device 10. As illustrated in FIG. 5, the compiler device 10 includes a communication unit 21, an input unit 22, a display unit 23, a control unit 24, and a storage unit 25.

The communication unit 21 is a processing unit for connecting the compiler device 10 to a network such as the Internet or LAN, and is achieved by the above-mentioned communication interface 10*d*.

The input unit 22 is a processing unit for the user to input various data to the compiler device 10, and is achieved by the above-mentioned input device 10*e*.

The display unit 23 is a processing unit that displays the compilation result, the error that occurred during compilation, and the like, and is achieved by the above-mentioned display device 10*f*.

The storage unit 25 is achieved by the storage 10*a* and the memory 10*b*, and stores, for example, an intermediate code generated by the compiler device 10.

The control unit 24 is a processing unit that controls each unit of the compiler device 10. As an example, the control unit 24 includes an acquisition unit 31, an intermediate code generation unit 32, an optimization code generation unit 33, a machine language generation unit 34, and an output unit 35.

The acquisition unit 31 acquires the source program 12 to be compiled through the communication unit 21 and stores it in the storage unit 25.

Further, the intermediate code generation unit 32 is a processing unit that generates an intermediate code 41 that performs processing equivalent to that of the source program 12 by performing lexical analysis, syntactic analysis, and semantic analysis on the source program 12. The intermediate code 41 is an example of a second program. Further, the intermediate code generation unit 32 stores the generated intermediate code 41 in the storage unit 25.

The optimization code generation unit 33 generates an optimization code 42, which is an intermediate code obtained by parallelizing the loops included in the intermediate code 41, and stores the optimization code 42 in the storage unit 25. The optimization code 42 is an example of a first program.

The machine language generation unit 34 converts the optimization code 42 into a machine language, and stores the executable program 13 including the machine language in the storage unit 25.

The output unit 35 is a processing unit that outputs the executable program 13 stored in the storage unit 25 to the outside of the compiler device 10 through the communication unit 21.

Figure 6:
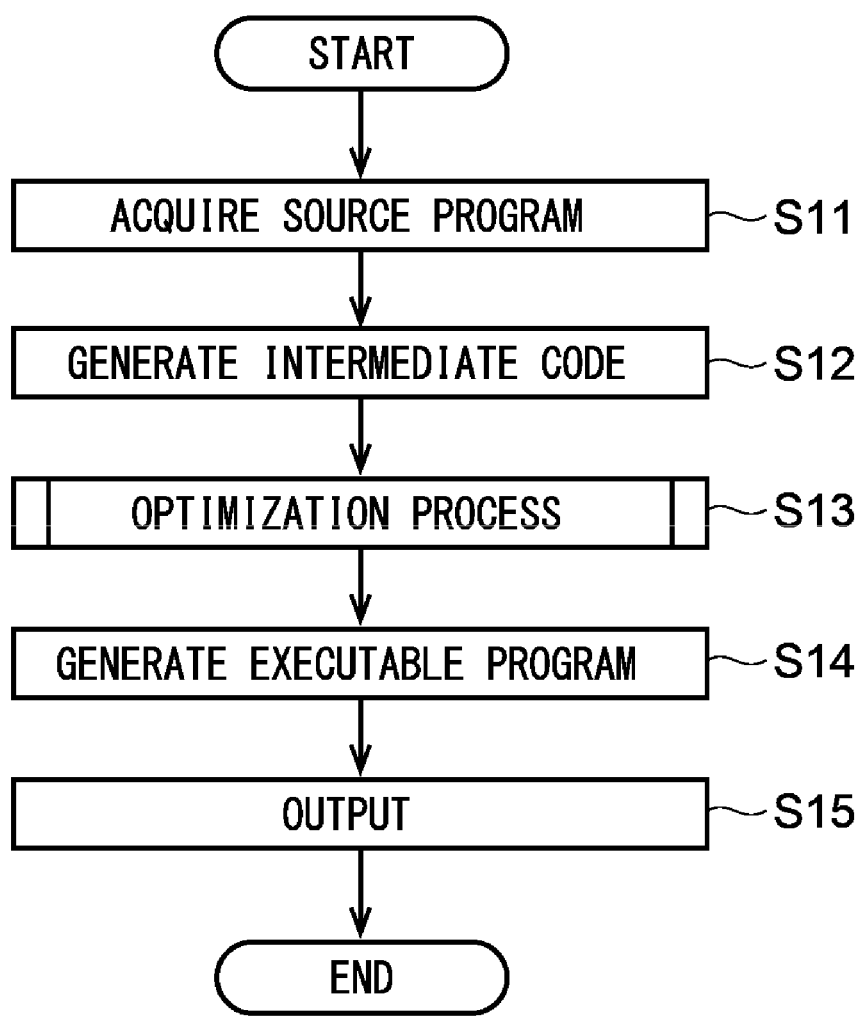
FIG. 6 is a flowchart of a compilation method according to the first embodiment.

FIG. 6 is a flowchart of a compilation method according to the present embodiment.

First, the acquisition unit 31 acquires the source program 12 (step S11), and the intermediate code generation unit 32 generates the intermediate code 41 of the source program 12 (step S12).

Next, the optimization code generation unit 33 performs an optimization process for generating the optimization code 42 (step S13).

Next, the machine language generation unit 34 generates the executable program 13 in which the optimization code 42 is converted into the machine language (step S14), and the output unit 35 outputs the executable program 13 (step S15).

This completes the basic processing of the compilation method according to the present embodiment.

Next, the optimization process in step S13 will be described.

Figure 7:
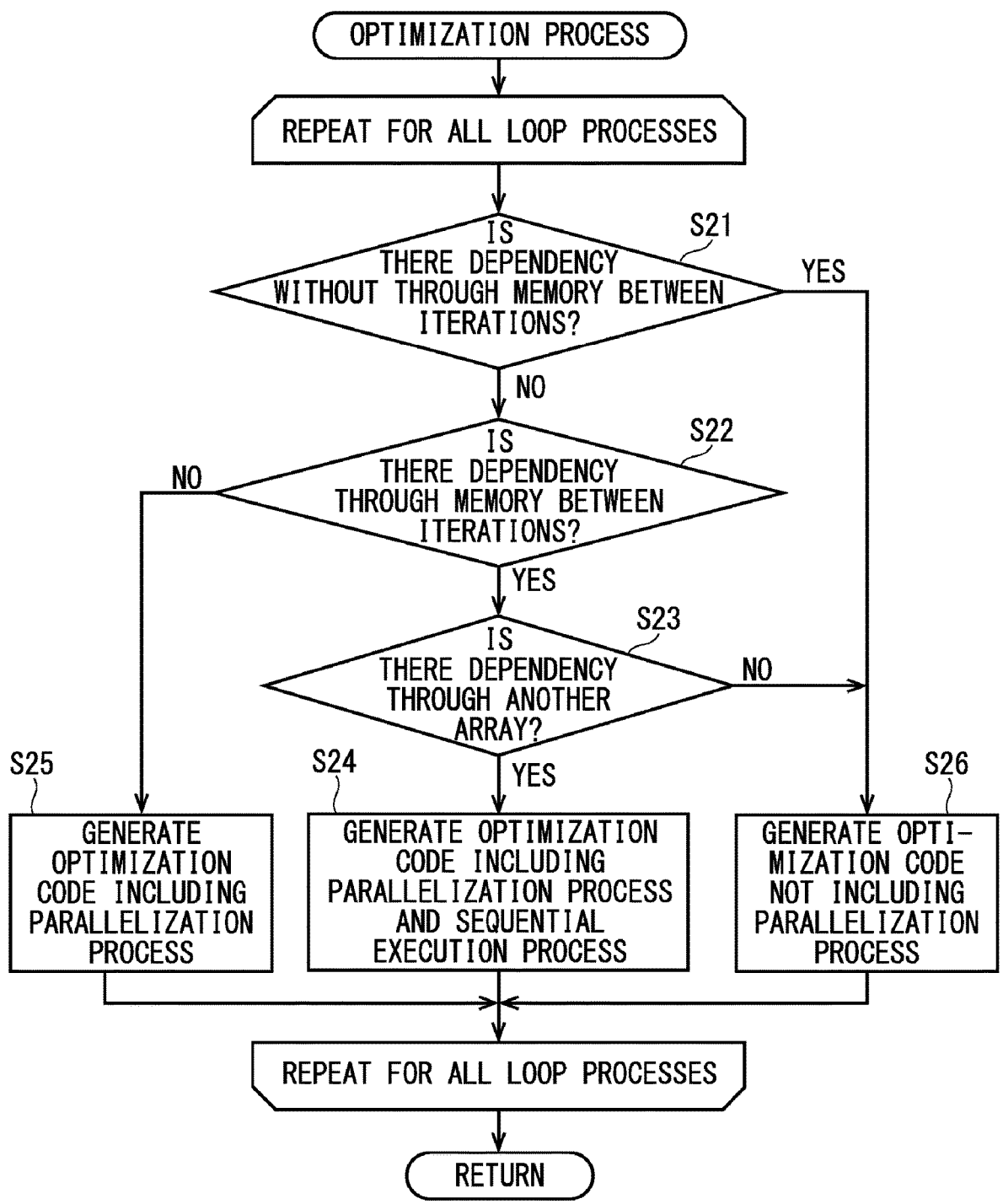
FIG. 7 is a flowchart of an optimization process according to the first embodiment.

FIG. 7 is a flowchart of the optimization process. First, the optimization code generation unit 33 determines whether the loop included in the intermediate code 41 has the dependency without through the memory 10*b* between the iterations (step S21).

Figure 8:
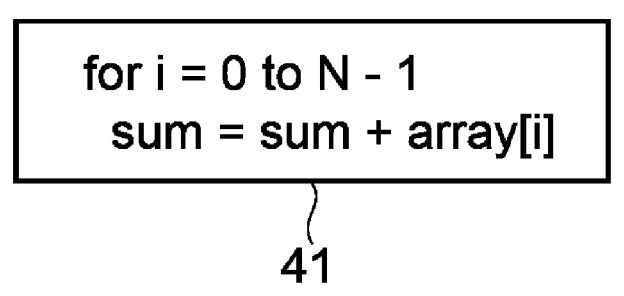

FIG. 8 is a schematic diagram of a pseudo code obtained by converting the intermediate code 41 having the dependency without through the memory 10*b* between the iterations into the source code.

In the example of FIG. 8, an element of the array "array" is added to a variable "sum" inside the loop by the for statement. In this case, a variable "sum" is assigned to the register of the processor 10*c*, and an area for storing the variable "sum" is not secured in the memory 10*b*. Therefore, when i and j are different integers, the reference destinations of the memory 10*b* are not duplicate in the i-th and the j-th iterations.

However, since the (i+1)-th iteration uses the variable "sum" that stores the result of the i-th iteration, the execution result of the (i+1)-th iteration changes depending on the execution result of the i-th iteration. Although the reference destinations of the memory 10*b* in different iterations are different in this way, when the execution result of one iteration changes depending on the execution result of the other iteration, it is called that there is the dependency without through the memory 10*b* between the iterations.

FIG. 7 is referred to again. If the determination in step S21 is YES, the parallelization of the loops is abandoned in the present embodiment, and the optimization code generation unit 33 generates the optimization code 42 that does not include the parallelization process in step S26.

On the other hand, if the determination in step S21 is NO, the procedure proceeds to step S22. In step S22, the optimization code generation unit 33 determines whether the loop included in the intermediate code 41 has the dependency through the memory 10*b* between the iterations.

Figures 9A, 9B:
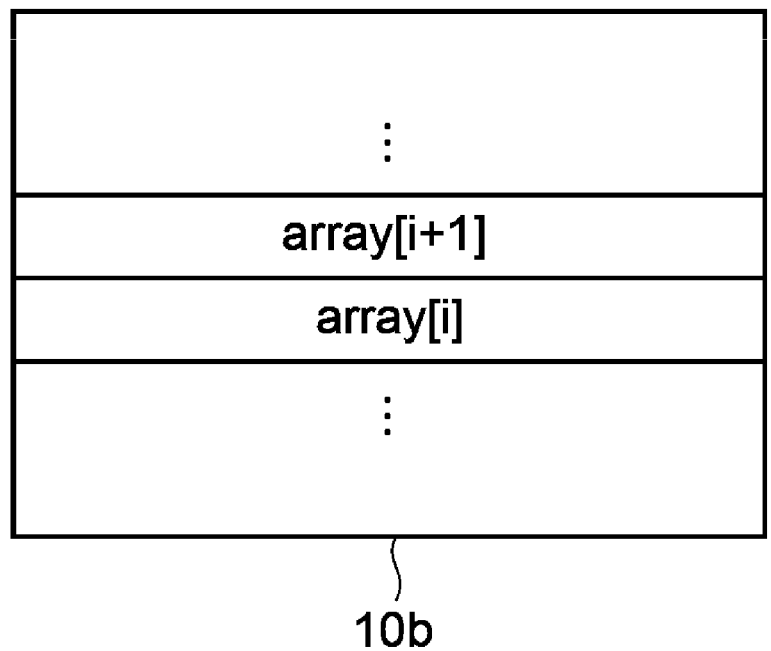
FIG. 9A is a schematic diagram of a pseudo code obtained by converting an intermediate code having a dependency through a memory between iterations into a source code.
FIG. 9B is a schematic diagram illustrating respective elements "array [i]" and "array[i+1]" secured in the memory.

FIG. 9A is a schematic diagram of a pseudo code obtained by converting the intermediate code 41 having the dependency through the memory 10*b* between iterations into the source code.

In the example of FIG. 9A, inside the loop by the for statement, 1 is added to the (i+1)-th element "array[i+1]" of the array "array", and the result is stored in the i-th element "array [i]".

FIG. 9B is a schematic diagram illustrating respective elements "array [i]" and "array[i+1]" secured in the memory 10*b*.

In this example, the element "array [i+1]" is referenced in the i-th iteration of the loop, and a value is stored in the element "array[i+1]" in the (i+1)-th iteration. Therefore, the reference destinations of the memory 10*b* in the i-th and the (i+1)-th are duplicate in the element "array[i+1]". When the reference destinations of the memory 10*b* in the different iterations are duplicate in this way, it is called that there is the dependency through the memory 10*b* between the iterations.

FIG. 7 is referred to again. If the determination in step S22 is NO, the procedure proceeds to step S25. In step S25, the optimization code generation unit 33 generates the optimization code 42 including the parallelization process in which the loops included in the intermediate code 41 are parallelized.

FIG. 10A is a schematic diagram of a pseudo code obtained by converting the intermediate code 41 that is a source of the optimization code 42 into the source code. As illustrated in FIG. 10A, in this loop, there is no dependency through the memory 10*b* between different iterations.

FIG. 10B is a schematic diagram of a pseudo code obtained by converting the optimization code 42 generated from the loop of FIG. 10A into the source code in step S25.

In the example of FIG. 10B, the process 51 inside the loop is parallelized by a keyword "parallel". A method of the parallelization is not particularly limited. For example, different iterations "i" may be assigned to a plurality of arithmetic cores of the CPU included in the target machine, and the process 51 may be performed by the different arithmetic cores every iterations "i". When the CPU of the target machine is a vector processor, the process 51 may be parallelized by vectorization that treats the array element "array [i]" as a vector element.

FIG. 7 is referred to again. If the determination in step S22 is YES, the procedure proceeds to step S23. In step S23, the optimization code generation unit 33 determines whether the loop included in the intermediate code 41 has the dependency through another array.

Figure 11A:
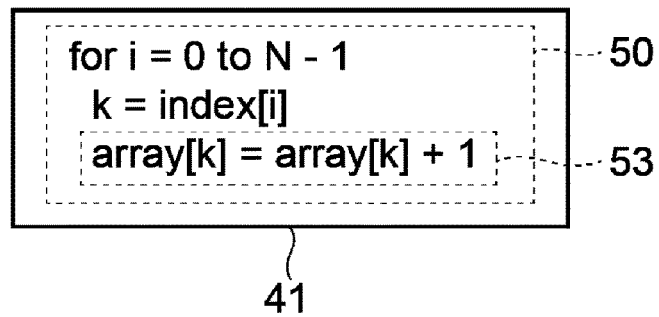
FIG. 11A is a schematic diagram of a pseudo code obtained by converting the intermediate code having a dependency through another array into the source code.

FIG. 11A is a schematic diagram of a pseudo code obtained by converting the intermediate code 41 having the dependency through another array into the source code.

The pseudo code is the same as the code of FIG. 2A, and has a loop 50 including a process 53 that adds "1" to the element of the array "array". Further, in the process 53, an index "k" of the array "array" is determined by the element "index[i]" of another array "index" different from the array "array".

In the present embodiment, when the index of a certain array is determined by the element of another array inside the loop 50 in this way, it is called that the loop 50 has a dependency through the another array. Also, the array to be used as the index shall not be rewritten during the loop.

The array "index" in FIG. 11A is an example of the first array having the iteration "i" as the index. Further, the array "array" is an example of the second array having the element "index[i]" of the array "index" as the index.

Figure 11B:
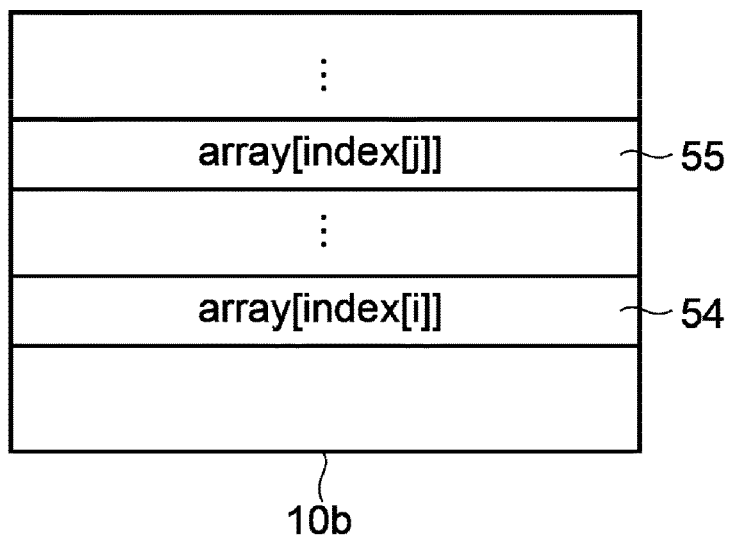
FIG. 11B is a schematic diagram of the memory to which the arrays "array" and "index" are allocated.

FIG. 11B is a schematic diagram of the memory 10b to which the arrays "array" and "index" are allocated.

In FIG. 11B, it is assumed that the elements "index[i]" and "index[j]" of the array "index" are different for the iterations "i" and "j" that are different from each other. In this case, the element "array [index[i]]" of the array "array" is allocated to a first area 54 in the memory 10b. Further, the element "array [index[j]]" is allocated to a second area 55 not in duplicate with the first area 54 in the memory 10b.

Therefore, even if the process 53 of iteration "i" and the process 53 of iteration "j" are executed in parallel, the execution result of one process 53 does not change depending on the execution result of the other process 53, and the iterations "i" and "j" can be executed in parallel.

The iterations "i" and "j" in this example are examples of a first execution time and a second execution time, respectively. Further, the element "array[index[i]]" is an example of a first element, and the element "array[index[j]]" is an example of a second element.

Figure 11C:
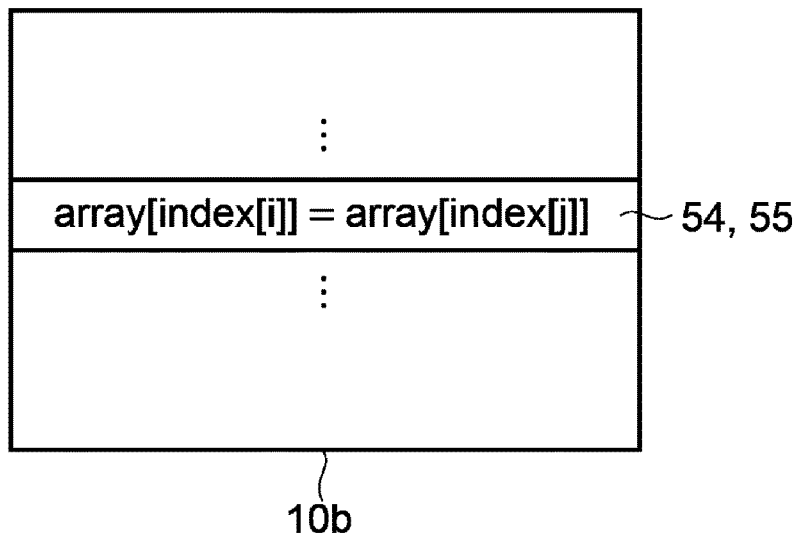
FIG. 11C is a schematic diagram of the memory when processes cannot be executed in parallel.

FIG. 11C is a schematic diagram of the memory 10b when the process cannot be executed in parallel.

In this example, it is assumed that the elements "index[i]" and ""index[j]" of the array "index" are the same for the iterations "i" and "j" that are different from each other. In this case, the first area 54 and the second area 55 match and are duplicate. Therefore, if the process 53 of the iteration "i" and the process 53 of the iteration "j" are executed in parallel, the execution result of one process 53 changes depending on the execution result of the other process 53, and the processes 53 cannot be executed in parallel.

In this way, if the loop 50 included in the intermediate code 41 has the dependency through another array, there are the case where the processes 53 in the loop 50 can be parallelized (FIG. 11B) and the case where it cannot be parallelized (FIG. 11C).

FIG. 7 is referred to again. If the determination in step S23 is YES, the optimization code generation unit 33 generates the optimization code 42 based on the intermediate code 41 (step S24). In this case, there are the case where the processes 53 in the loop 50 can be parallelized and the case where it cannot be parallelized, as described above. Therefore, the optimization code generation unit 33 generates, inside the optimization code 42, a code in which the processes in the loop 50 are parallelized and a code in which the processes are sequentially executed without being parallelized.

FIG. 12 is a schematic diagram of a pseudo code obtained by converting the optimization code generated by the optimization code generation unit 33 in this way into the source code.

Here, a case where the optimization code generation unit 33 generates the optimization code 42 from the intermediate code 41 in FIG. 11A will be described as an example. Hereinafter, a block of the for statement in the optimization code 42 is defined by indentation.

As illustrated in FIG. 12, the optimization code 42 has a first code 56, a second code 57 and a third code 58.

The first code 56 is a code that defines a function "has_no_dupulicated_index( )". The function "has_no_dupulicated_index( )" is a function to determine whether the first area 54 and the second area 55 (see FIG. 11B) that are referenced by the process 53 in each of the iterations "i" and "j" are duplicate for all combinations of "i" and "j". If the determination reveals that the areas 54 and 55 are duplicate in any combination of "i" and "j", the function "has_no_dupulicated_index( )" returns "FALSE". On the other hand, if the determination reveals that the areas 54 and 55 are not duplicate in all combinations of "i" and "j", the function "has_no_dupulicated_index( )" returns "TRUE".

In this example, the function "has_no_dupulicated_index( )" determines whether the areas 54 and 55 are duplicate by determining whether the elements "index[i]" and "index[j]" are the same in a statement "index[i]==index [j]". The element "index[i]" is an example of a third element, and the element "index[j]" is an example of a fourth element.

When the function "has_no_dupulicated_index( )" returns "FALSE", the target machine executes the second code 57 by the if statement on the first line.

The second code 57 is the same as the loop 50 (see FIG. 11A) of the original intermediate code 41 that is not parallelized. Therefore, when the target machine executes the second code 57, the processes 53 are executed in an order of iterations. Thus, in the present embodiment, when the areas 54 and 55 are duplicate in any combination of "i" and "j", the target machine executes the second code 57 that executes the processes 53 in the order of iterations without parallelizing the processes 53.

On the other hand, when the function "has_no_dupulicated_index( )" returns "TRUE", the target machine executes the third code 58 by the if statement on the first line.

The third code 58 has a keyword "parallel" on the second line, whereby the target machine executes the respective processes 53 of the iterations "i" and "j" in parallel. The method of parallelization is not particularly limited, and the processes 53 may be parallelized by, for example, thread parallelization. In the thread parallelization, the parallelization is achieved by dividing a section [0, N−1] into a plurality of subsections and assigning each subsection to each of the plurality of arithmetic cores in the CPU of the target machine.

As described above, in the present embodiment, when the areas 54 and 55 are not in duplicate with each other in all the combinations of "i" and "j", the target machine executes the third code 58 that executes the processes 53 in parallel.

FIG. 7 is referred to again. If the determination in step S23 is NO, the procedure proceeds to step S26. In step S26, the optimization code generation unit 33 generates only the second code that does not include the parallelization process as the optimization code 42.

After this, steps S21 to S26 are repeated for all loops included in the intermediate code, and then the procedure returns to the caller.

This completes the basic process of the compilation method according to the present embodiment.

According to the present embodiment described above, the optimization code generation unit 33 generates the optimization code 42 including the first to third codes 56 to 58, as illustrated in FIG. 12. In the optimization code 42, the first code 56 determines whether the areas 54 and 55 in the memory 10b are duplicate. When it is determined that the areas 54 and 55 are not in duplicate with each other, the processes 53 are executed in parallel by the third code 58, so that the execution speed of the executable program 13 can be improved. On the other hand, when it is determined that the areas 54 and 55 are duplicate, the processes 53 are executed in the order of iterations in the second code 57, so that it is possible to prevent the execution result from being different from the execution result of the original loop 50 by executing the processes 53 in parallel.

The present embodiment is not limited to the above. For example, in the above, the processes 53 are parallelized by thread parallelization in the third code 58, but when the CPU of the target machine is the vector processor, the parallelization may be performed by vectorization as follows.

FIG. 13 is a schematic diagram of a pseudo code obtained by converting the optimization code 42 in the case of parallelizing the processes 53 by vectorization into the source code.

As illustrated in FIG. 13, the optimization code 42 includes the first code 56, the second code 57, the third code 58 and a definition code 59.

The first code 56 is a code that defines a function "has_no_dupulicated_index_vector (iter)". The function "has_no_dupulicated_index_vector (iter)" receives an argument "iter" of an integer value, and determines whether there is a combination in which "index[i]" and "index[j]" are the same, among combinations of iterations "i" and "j" included in a section between "iter" and "VL−1". A variable "VL" is a length of the vector that can be calculated by the CPU of the target machine.

If there is a combination of iterations "i" and "j" where "index[i]" and "index[j]" are the same, the function "has_no_dupulicated_index_vector (iter)" returns "FALSE". On the other hand, if "index[i]" and "index[j]" are different for all iterations "i" and "j", the function "has_no_dupulicated_index_vector (iter)" returns "TRUE".

On the other hand, the definition code 59 is a code that defines a function "calc_vectorizable_iteration( )".

The function "calc_vectorizable_iteration( )" is a function that executes the function "has_no_dupulicated_index_vector (iter)" for each subsection when the section [0, N−1] is divided into subsections of length VL. Here, it is assumed that "N" is divisible by "VL".

In this example, if there is a combination in which "index[i]" and "index[j]" are the same, among the combinations of iterations "i" and "j" included in a certain subsection, "FALSE" is stored in an array element "vectorizable [p]" corresponding to an integer "p" representing the subsection. On the other hand, if "index[i]" and "index[j]" are not the same in all combinations of iterations "i" and "j" included in the subsection corresponding to the integer "p", "TRUE" is stored in the array element "vectorizable[p]".

In the example of FIG. 13, a value of an array element "vectorizable[i]" is evaluated by the if statement on the third line. Then, the second code 57 is executed for an i-th subsection in which the array element "vectorizable[i]" is "FALSE". The second code 57 is not a code that parallelizes the processes 53, but a code that executes the processes 53 in the order of iterations.

On the other hand, the third code 58 is executed for the i-th subinterval in which the array element "vectorizable [i]" is "TRUE".

The third code 58 is a code that executes vector operation on a vector "array[k]" of the array element. In this example, the third code 58 performs the processes 53 in parallel for all iterations included in the i-th subsection. The statement "array[k] =array[k]+(1, 1, . . . , 1)" on the 6th line indicates the process of adding a vector (1, 1, . . . 1) to a vector whose element is an array element "array[k]". This allows the processes 53 to be executed in parallel for all iterations included in the i-th subsection. The "index[i*VL:(i+1)*VL−1]" on the fifth line indicates elements from an "i*VL"-th to an "(i+1)*VL−1"-th of the array "index".

FIG. 14 is a schematic diagram illustrating an example of values of the respective elements in the respective arrays "vectorizable" and "index" when a length "VL" of a vector is 2.

As illustrated in FIG. 14, when the elements of the array "index" are different from each other, the value of the array "vectorizable" is "TRUE", and when the elements of the array "index" are the same as each other, the value of the array "vectorizable" is "FALSE".

Figure 15:
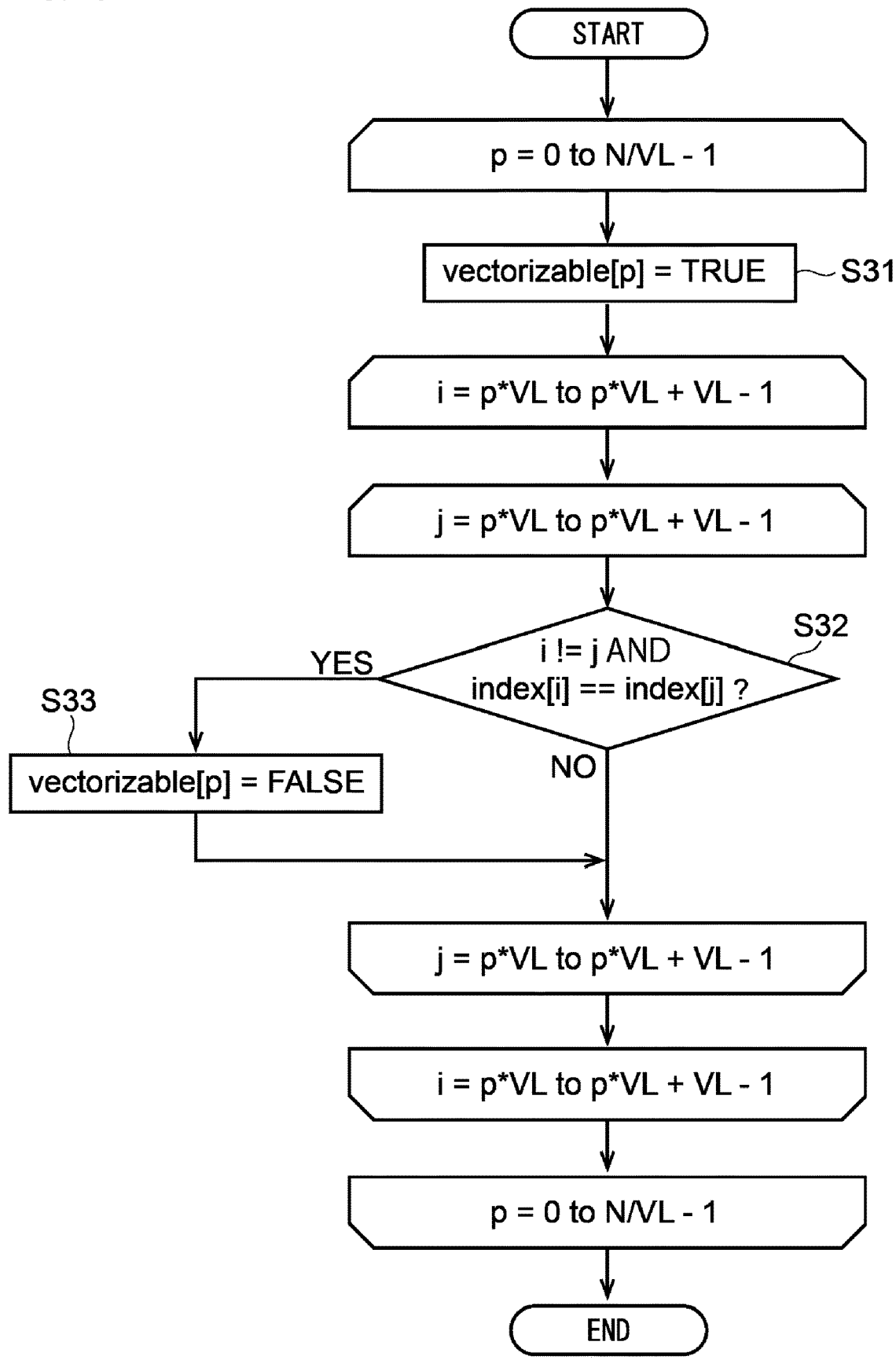
FIG. 15 is a flowchart when a target machine executes a first code and a fourth code of FIG. 13.

FIG. 15 is a flowchart when the target machine executes the first code 56 and the definition code 59 of FIG. 13.

First, the target machine substitutes "TRUE" for the array element "vectorizable [p]" (step S31).

Next, the target machine executes step S32 corresponding to the if statement on the 26th line. In step S32, the target machine determines whether the array element "index[i]" and the array element "index[j]" are equal to each other for different "i" and "j". If the determination in step S32 is YES, the procedure proceeds to step S33, and the target machine substitutes "FALSE" for the array element "vectorizable[p]".

When the determination in step S32 is NO and after step S33 is completed, the above steps S31 to S33 are repeated for each of "p", "i" and "j" to end the process.

According to the above, when the areas 54 and 55 in the memory 10b are not in duplicate with each other, the processes 53 can be executed in parallel on the target machine provided with the vector processor, and the execution speed of the executable program 13 can be improved.

Second Embodiment

In the first embodiment, the optimization code generation unit 33 generates the optimization code 42 illustrated in FIG. 12. In the optimization code 42, the if statement on the first line calls the function "has_no_dupulicated_index( )". Therefore, when the target machine executes the executable program 13, the target machine always executes the first code 56 that defines the function "has_no_dupulicated_index( )".

However, when the source program 12 calls the loop 50 (see FIG. 11A) multiple times, if the target machine always executes the first code 56 each time the loop 50 is called, the execution speed of the executable program 13 decreases.

Therefore, in the present embodiment, the decrease in the execution speed of the executable program 13 is suppressed as follows.

FIG. 16 is a schematic diagram of a pseudo code obtained by converting the optimization code 42 generated by the optimization code generation unit 33 into the source code in the present embodiment.

In FIG. 16, codes representing the same processes as those in FIG. 12 are designated by the same reference numerals as those in FIG. 12, and the description thereof will be omitted below.

As illustrated in FIG. 16, in the present embodiment, the optimization code generation unit 33 generates a fourth code 61, a fifth code 62 and a sixth code 63 inside the first code 56.

The first code 56 is a function that defines the function "has_no_dupulicated_index( )" as in the first embodiment. Here, the arguments of the function "has_no_dupulicated_index( )" according to the present embodiment are a start address "start_addr" and an end_address "end_addr" in the memory 10b.

When the executable program 13 is executed, an address "&index[0]" of a first element of the array "index" is set as the start address "start_addr". An address "&index[N×1]" of a last element of the array "index" is set as the end address "end_addr".

As described in the sixth code 63, the function "has_no_dupulicated_index( )" returns the array element result [{start_addr, end_addr}] when the value of the array element "is_check_done[{start_addr, end_addr}]" is "TRUE".

The array element "is_check_done [{start_addr, end_addr}]" is an element that indicates whether the contents of the areas of the memory 10b determined by the start address "start_addr" and the end address "end_addr" have not been changed since the loop 50 was executed last time. For example, if all the contents of the array elements "index[0]" through "index[N-1]" have not been changed since the loop 50 was executed last time, the value of the array element "is_check_done[{start_addr, end_addr}]" is "TRUE". On the other hand, if the contents of any of the array elements "index[0]" through "index[N-1]" have been changed since the loop 50 was executed last time, the value of the array element "is_check_done[{start_addr, end_addr}]" is "FALSE".

The array "is_check_done" is an associative array. The element "{start_addr, end_addr}" is "TRUE" or "FALSE" associated with a pair of "start_addr" and "end_addr". If neither "TRUE" nor "FALSE" is associated with the pair of "start_addr" and "end_addr", the value of "is_check_done [{start_addr, end_addr}]" is defined as "FALSE". Such an associative array can be implemented, for example, in a hash table or the like.

In addition, the array element result[{start_addr, end_addr}] stores a determination result when the loop 50 was executed last time. The determination result is a determination result whether there are addresses in which contents "*i" and "*j" are the same among the mutual different addresses "i" and "j" between the start address "start_addr" and the end address "end_addr", as indicated in the if statement on the 17th line.

Note that "*i" indicates the contents stored in the address "i". For example, if "i" is "&index[0]", then "*i" is "index [0]". The same applies to "*j". Therefore, the if statement on the 17th line indicates the same process as the code on the 14th line of FIG. 12, and is a code to determine whether there are mutually different "i" and "j" in the range of 0 to N−1 such that "index[i]" is equal to "index[j]".

Further, the sixth code 63 returns a return value on the 13th line when a value of the array element result[{start_addr, end_addr}] is "TRUE", and skips the 14th and subsequent lines. Thereby, when the value of the array element result[ {start_addr, end_addr}] is "TRUE", the determination of the if statement on the 17th line is skipped and the process is speeded up.

The fourth code 61 is a code that stores the result of the determination of the if statement on the 17th line, and has a code 61a and a code 61b. The code 61a is a code that saves "TRUE" as an initial value in the array element result [{start_addr, end_addr}]. Further, the code 61b is a code that saves "FALSE" in the array element result [{start_addr, end_addr}] when a conditional expression of the if statement on the 17th line is satisfied.

When the determination by the if statement on the 17th line is completed, the code on the 19th line is executed, and "TRUE" is stored in the array element "is_check_done [{start_addr, end_addr}]".

The if statement on the 20th line is a statement to determine whether there is an area in the memory 10b in duplicate with the address range between the start address "start_addr" and the end address "end_addr" and in which the element of the array "is_check_done" is "TRUE". If this determination is YES, "FALSE" is stored in the element of the array "is_check_done" corresponding to the area in the 21st line, and a watchpoint function of the area is canceled. The watchpoint function is a function of detecting whether the contents of the memory 10b in the specified address range have changed, and is a function possessed by the CPU of the target machine.

After that, a function "set watchpoint ( )" is called in the fifth code 62 on the 22nd line.

The function "set_watchpoint( )" is a function that receives the start address "start_addr", the end address "end_addr", and a function "disable_result( )" as arguments, and sets the CPU to call "disable_result( )" when the contents in a range between these addresses are changed. An achieving method of the function "set_watchpoint( )" is not particularly limited. In the present embodiment, the function "set_watchpoint( )" is achieved by using a watchpoint function provided in the CPU of the target machine.

Further, as described above, when the executable program 13 is executed, the start address "start_addr" and the end_address "end_addr" are equal to "&index[]" and "&index [N−1]", respectively. Therefore, the function "set_watchpoint( )" is set to detect whether any of the contents of the array elements "index[0]" to "index[N−1]" has been changed.

Then, when a change in the contents is detected, the function "disable_result( )" is called.

After that, in the 23rd line, the array element result [{start_addr, end_addr}] is returned as the return value of the function "has_no_dupulicated_index( )".

The function "disable_result ( )" in the fifth code 62 is an exception handler and is defined in the 26th to 30th lines. Here, in the 27th line, the start address and the end address of the address range whose contents have been changed are stored in the variable "start_addr" and the variable "end_addr", respectively. Information on this address range is provided by the watchpoint function.

Further, in the 28th line, "FALSE" is stored in the array element "is_check_done [{start_addr, end_addr}]" corresponding to the address range set in the 27th line.

Then, a function "unset_watchpoint( )" is called on the 29th line. The function "unset_watchpoint( )" is a function that receives the start address "start_addr" and the end address "end_addr" as arguments and disables the watchpoint function that detects the change in the contents in the address range.

Figure 17:
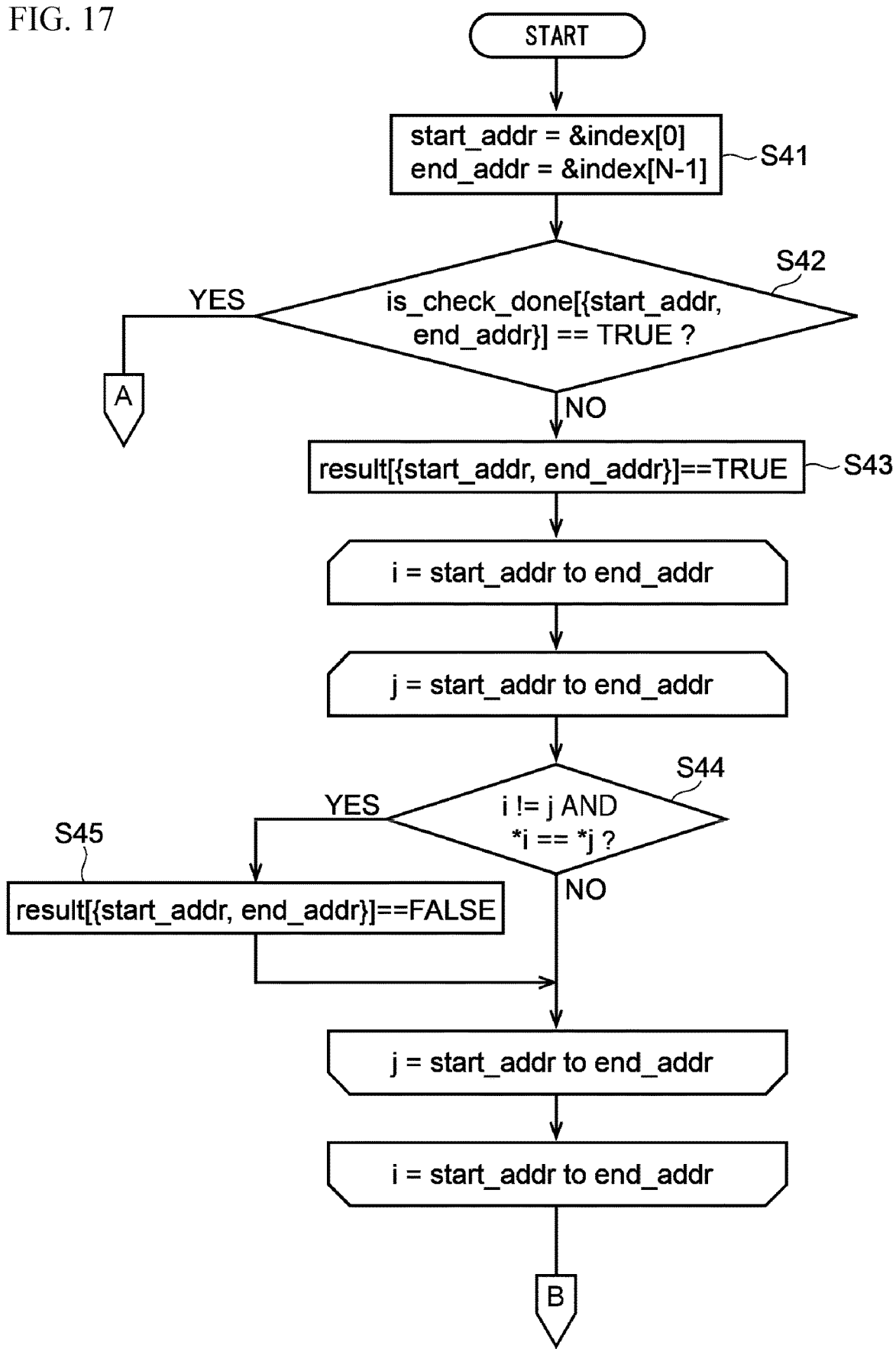
FIG. 17 is a flowchart when the target machine executes the first code in the optimization code of FIG. 16 (part 1)
Figure 18:
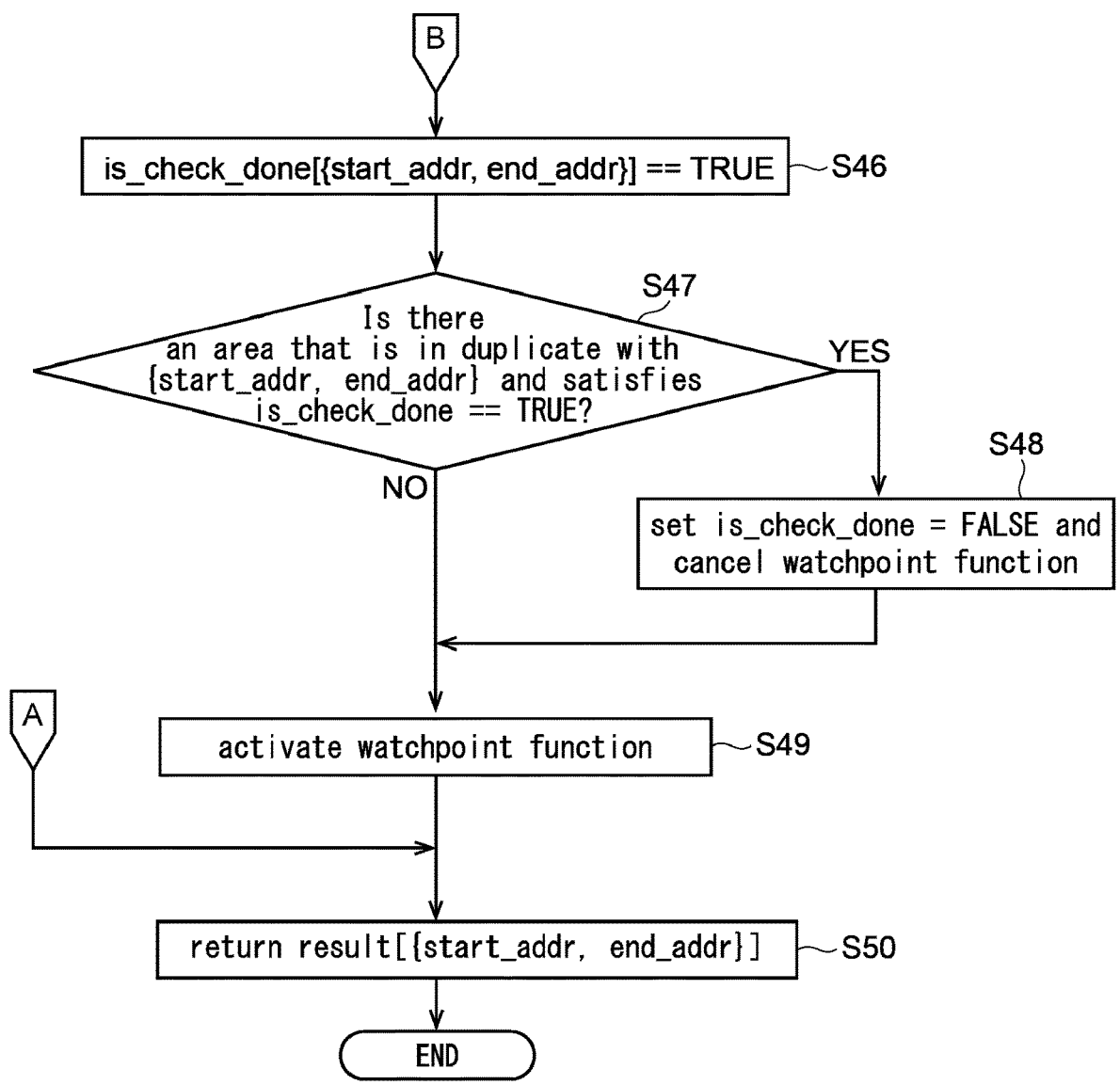
FIG. 18 is a flowchart when the target machine executes the first code in the optimization code of FIG. 16 (part 2).

FIGS. 17 and 18 are flowcharts when the target machine executes the first code 56 in the optimization code 42 of FIG. 16.

First, the target machine sets the addresses of the array elements "index[0]" and "index[N−1]" as arguments to the function "has_no_dupulicated_index( )" (step S41).

Next, the target machine executes the if statement on the 12th line to determine whether the value of the array element "is_check_done[{start_addr, end_addr}]" is "TRUE" (step S42).

If this determination is YES, the target machine executes the 13th line, returns the array element result[{start_addr, end_addr}] (step S50), and ends the process.

On the other hand, if the determination in step S42 is NO, the procedure proceeds to step S43.

In step S43, the target machine executes the code 61a to save "TRUE" in the array element result[{start_addr, end_addr}].

Next, the target machine executes the if statement on the 17th line, and determines whether there are addresses in which contents "*i" and "*j" are the same among the mutual different addresses "i" and "j" between the start address "start_addr" and the end address "end_addr" (step S44).

This determination is made for all combinations of addresses "i" and "j" in the address range between the start address "start_addr" and the end address "end_addr".

Then, if the determination in step S44 is YES, the target machine executes the code 61b to save "FALSE" in the array element result[{start_addr, end_addr}] (step S45).

Subsequently, when the target machine executes the 19th line, "TRUE" is stored in the array element "is_check_done [{start_addr, end_addr}]" (step S46).

Next, the target machine executes the if statement on the 20th line to determine if there is an area where the element of the array "is_check_done" is "TRUE" among the areas in duplicate with the address range between "start_addr" and "end_addr" (step S47).

If this determination is YES, the target machine executes the 21st line to store "FALSE" in the element of the array "is_check_done" corresponding to the area and cancel the watchpoint function of the area (Step S48).

On the other hand, if the determination in step S47 is NO, the process proceeds to step S49. In step S49, the target machine activates the watchpoint function by executing the fifth code 62 on the 22nd line.

Then, the target machine executes the 23rd line to return the array element result[{start_addr, end_addr}] (step S50) and ends the process.

According to the present embodiment described above, when the target machine calls the loop 50 multiple times, if the array elements "index[]" to "index[N−1]" have not been changed since the previous call, the determination of the if statement in step S17 is skipped.

Therefore, when the array elements "index [0]" to "index [N−1]" are not changed in the first call of the loop 50 for example, the if statement in step S17 is skipped in the subsequent second call of the loop 50, which can improve the execution speed of the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium having stored therein a program for causing a computer to execute a process, the process comprising:
   acquiring a source program;
   generating a first program that performs processing equivalent to processing of the source program by performing lexical analysis, syntactic analysis, and semantic analysis on the source program; and
   generating a second program, the second program includes:
   a first code that determines whether a first area of a memory that a process inside a loop included in the first program refers to in a first execution time of the loop is in duplicate with a second area of the memory that the process refers to in a second execution time of the loop;
   a second code that executes the process in an order of the first and second execution times when it is determined that the first area and the second area are duplicate; and
   a third code that executes the process for the first execution time and the process for the second execution time in parallel when it is determined that the first area and the second area are not duplicate,
   the loop has a first array indexed by an execution time of the loop and a second array indexed by each element of the first array,
   the process is to store a first element of the second array in the memory in the first execution time and to store a second element of the second array in the memory in the second execution time,
   the first area is an area in which the first element is stored in the first execution time, and
   the second area is an area in which the second element is stored in the second execution time.

2. The non-transitory computer-readable recording medium as claimed in claim 1, wherein
   the second program calls the loop multiple times, and
   the first program includes:
   a fourth code that stores a result of the determination at the time of a first call among a plurality of calls;
   a fifth code that detects whether a content of any of elements in the first array is changed after the result is stored; and
   a sixth code that skips the determination about whether the first area and the second area are duplicate at the time of a second call later than the first call among the plurality of calls when the content of the element is not changed.

3. The non-transitory computer-readable recording medium as claimed in claim 1, wherein the first code is a code that determines the first area and the second area are duplicate when a third element of the first array indexed by the first execution time is the same as a fourth element of the first array indexed by the second execution time, and determines the first area and the second area are not duplicate when the third element is not the same as the fourth element.

4. The non-transitory computer-readable recording medium as claimed in claim 1, wherein the third code is a code that executes a vector operation on a vector having the first element and the second element as elements.

5. A compilation method for causing a computer to execute a process, the process comprising:
  acquiring a source program;
  generating a first program that performs processing equivalent to processing of the source program by performing lexical analysis, syntactic analysis, and semantic analysis on the source program; and
  generating a second program;
  the second program includes:
  a first code that determines whether a first area of a memory that a process inside a loop included in the first program refers to in a first execution time of the loop is in duplicate with a second area of the memory that the process refers to in a second execution time of the loop;
  a second code that executes the process in an order of the first and second execution times when it is determined that the first area and the second area are duplicate; and
  a third code that executes the process for the first execution time and the process for the second execution time in parallel when it is determined that the first area and the second area are not duplicate,
  the loop has a first array indexed by an execution time of the loop and a second array indexed by each element of the first array,
  the process is to store a first element of the second array in the memory in the first execution time and to store a second element of the second array in the memory in the second execution time,
  the first area is an area in which the first element is stored in the first execution time, and
  the second area is an area in which the second element is stored in the second execution time.

6. A compiler device comprising:
  a memory; and
  a processor coupled to the memory, the processor being configured to
  acquire a source program;
  generate a first program that performs processing equivalent to processing of the source program by performing lexical analysis, syntactic analysis, and semantic analysis on the source program; and
  generate a second program;
  the second program includes:
  a first code that determines whether a first area of a memory that a process inside a loop included in the first program refers to in a first execution time of the loop is in duplicate with a second area of the memory that the process refers to in a second execution time of the loop;
  a second code that executes the process in an order of the first and second execution times when it is determined that the first area and the second area are duplicate; and
  a third code that executes the process for the first execution time and the process for the second execution time in parallel when it is determined that the first area and the second area are not duplicate,
  the loop has a first array indexed by an execution time of the loop and a second array indexed by each element of the first array,
  the process is to store a first element of the second array in the memory in the first execution time and to store a second element of the second array in the memory in the second execution time,
  the first area is an area in which the first element is stored in the first execution time, and
  the second area is an area in which the second element is stored in the second execution time.

* * * * *